Jan. 21, 1964     A. RUTKOVSKY ETAL     3,118,531
CONVEYOR FOR SELECTIVE DISPATCHING OF ARTICLES
Filed April 5, 1961     5 Sheets-Sheet 1
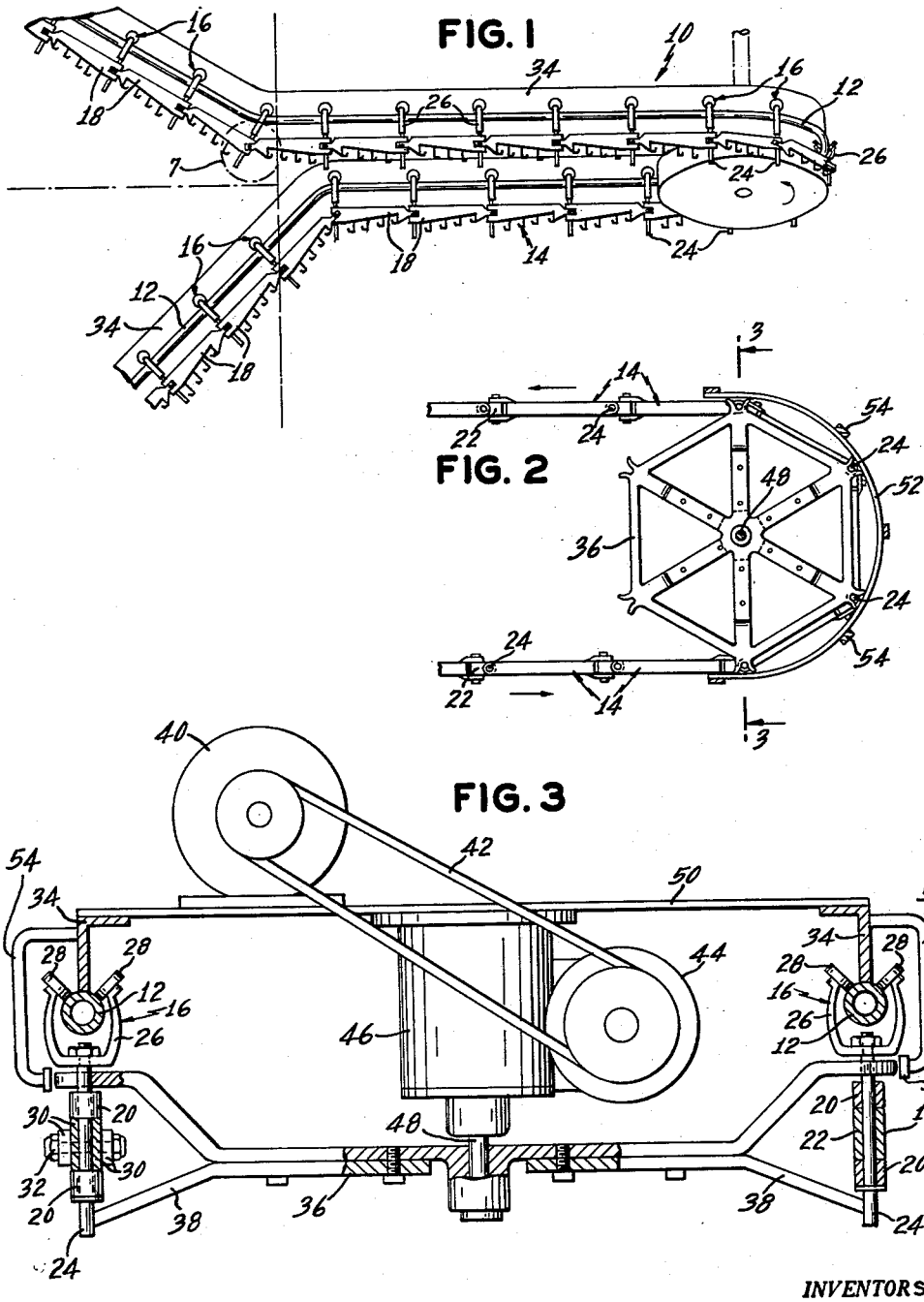
INVENTORS
ABRAHAM RUTKOVSKY
SAM RUTKOVSKY
BY
ATTORNEY

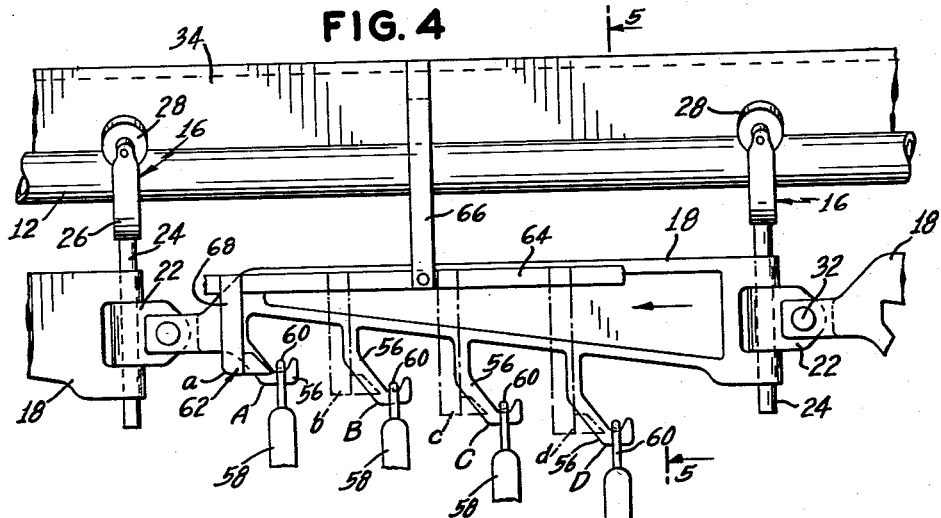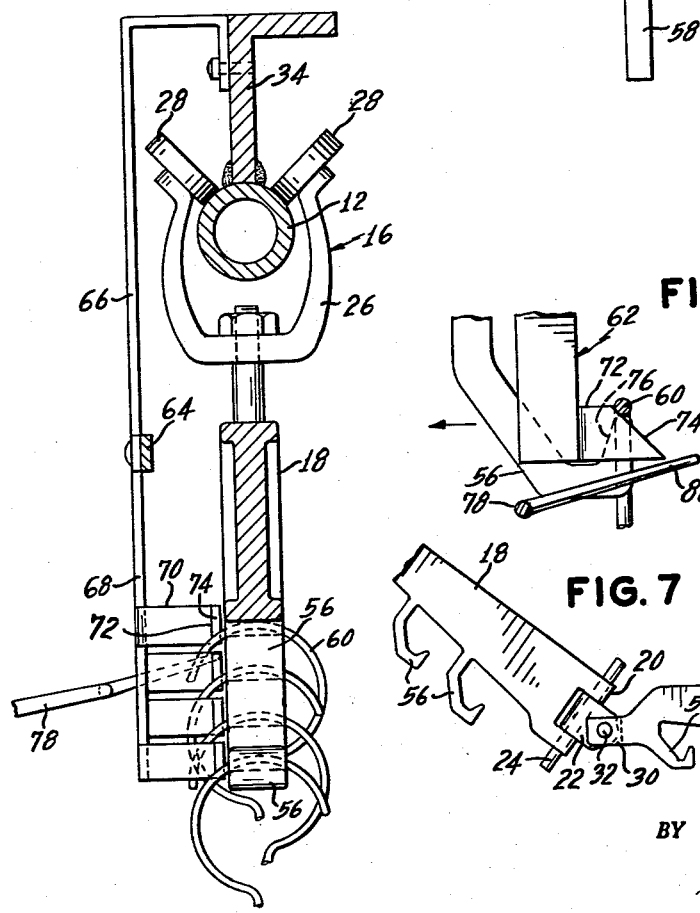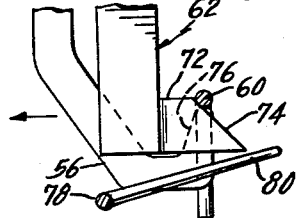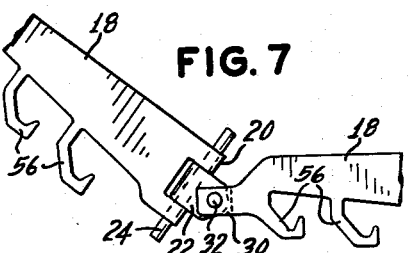

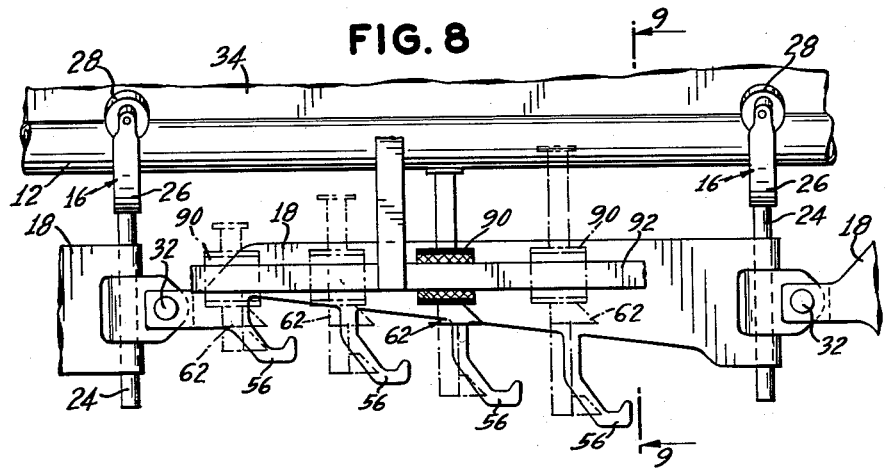
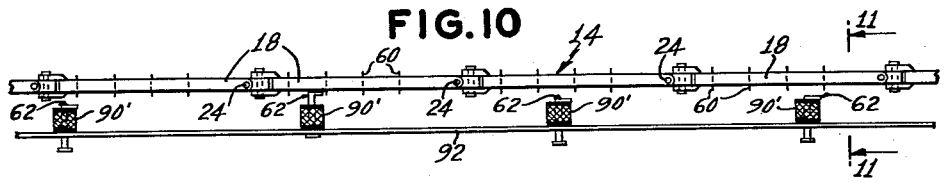
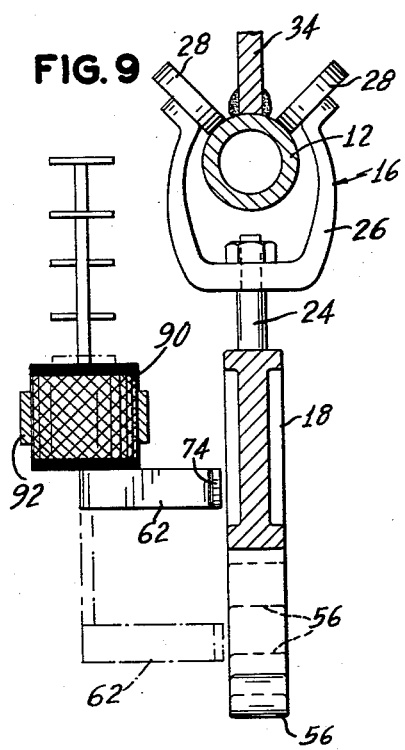
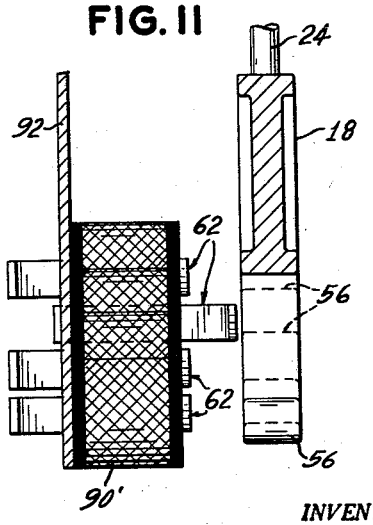

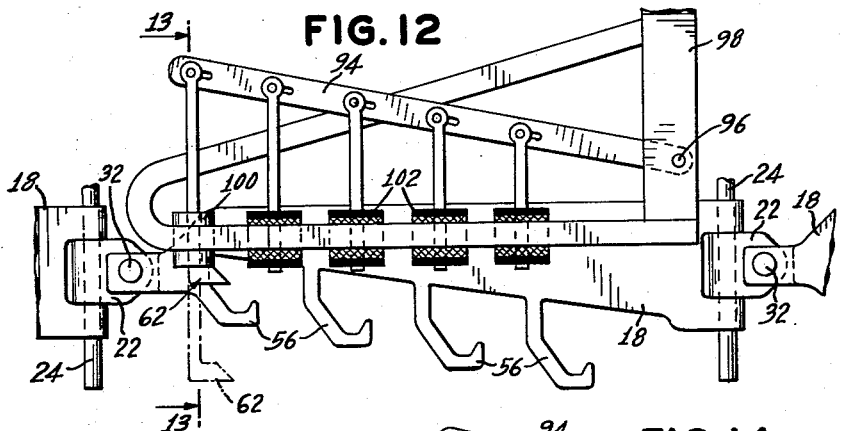

Jan. 21, 1964  A. RUTKOVSKY ETAL  3,118,531
CONVEYOR FOR SELECTIVE DISPATCHING OF ARTICLES
Filed April 5, 1961  5 Sheets-Sheet 5
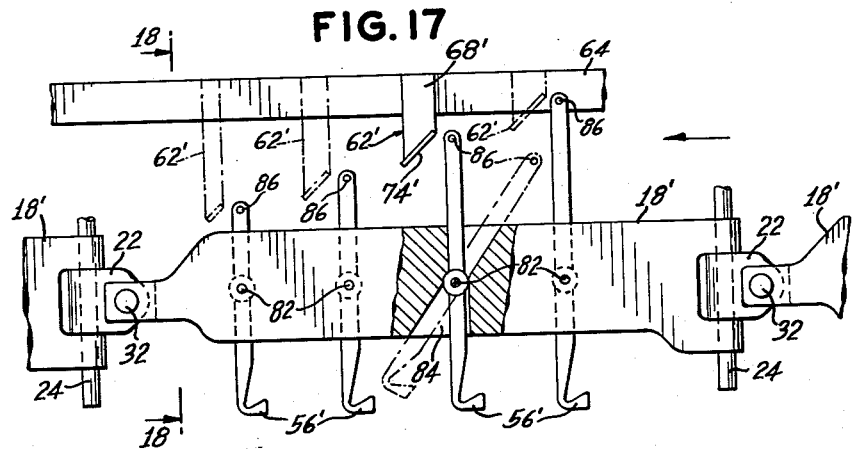
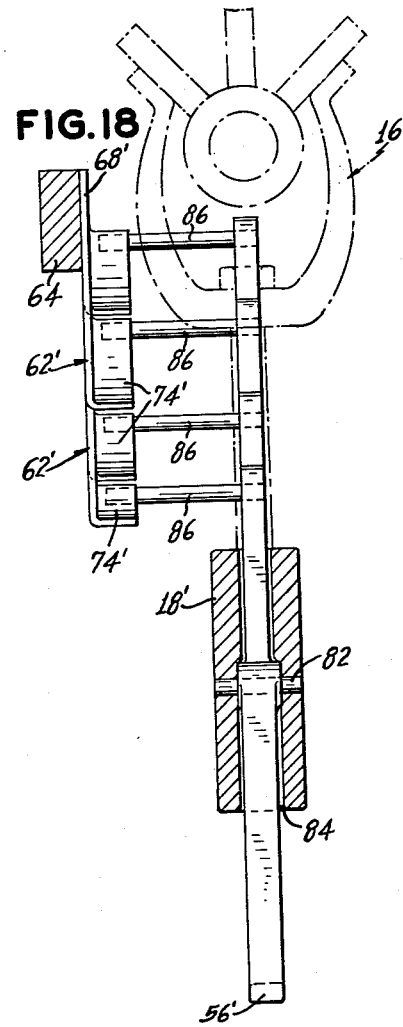
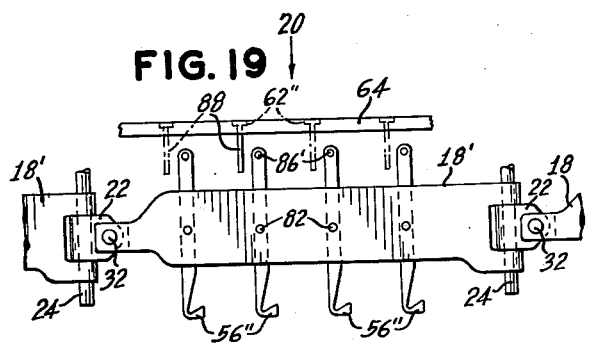
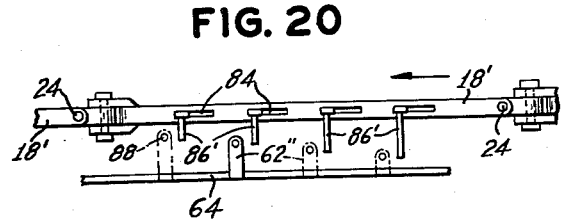
INVENTORS
ABRAHAM RUTKOVSKY
SAM RUTKOVSKY
BY
ATTORNEY

United States Patent Office 3,118,531
Patented Jan. 21, 1964

3,118,531
CONVEYOR FOR SELECTIVE DISPATCHING
OF ARTICLES
Abraham Rutkovsky and Sam Rutkovsky, Brooklyn,
N.Y., assignors, by mesne assignments, to Small Business Administration, Washington, D.C.
Filed Apr. 5, 1961, Ser. No. 100,866
21 Claims. (Cl. 198—38)

This invention relates to conveyors for delivering various classifications of articles to preselected locations.

One of the objects of the present invention is to provide a conveyor having an article supporting means movable along a rail with means for selectively removing different articles from the conveyor at preselected positions along the path of travel of the conveyor.

Another object is the provision of a conveyor of the above indicated type wherein the various articles are suspended from the conveyor by means of hooks and means are provided in the path of movement of the hooks for engaging them and thereby removing the hooks and the articles from the conveyor.

A further object is the provision of a conveyor wherein each link of the conveyor chain is provided with a series of article carrying members positioned at various levels and means are provided in the path of movement of the conveyor chain at levels corresponding to the levels of the article carrying members, respectively, for removing articles carried thereby.

Another object is the provision of a conveyor wherein each link of the conveyor chain is provided with a series of pivoted article carrying members and means are provided in the path of movement of said members to cause pivotal movement of the members to thereby remove the articles carried by said members.

Another object is the provision of a conveyor with article removing means which may be moved into operative and inoperative positions for selective removal of the articles from the conveyor.

A further object is the provision of a conveyor with article removing means which may be operated to remove any one of a plurality of classifications of articles from the conveyor at a particular position along the path of travel of the conveyor.

Another object is the provision of an article storing and delivering conveyor which is driven by a sprocket wheel with means for preventing the sprocket engaged parts of the conveyor chain from becoming disengaged from the teeth of the sprocket wheel during operation of the conveyor.

The above and other objects, features and advantages of the invention will be more fully understood from the following description of the invention considered in connection with the accompanying illustrative drawings.

In the drawings:

FIG. 1 is a perspective view, partly diagrammatic, of the driven end of the conveyor;

FIG. 2 is a top plan view of the driven end of the conveyor;

FIG. 3 is a sectional view, on a larger scale, taken on line 3—3 of FIG. 2;

FIG. 4 is a side elevational view of part of the conveyor;

FIG. 5 is a sectional view, on a larger scale, taken on line 5—5 of FIG. 4;

FIG. 6 is a detail elevational view illustrating the removal of an article from the conveyor;

FIG. 7 is a detail side elevational view illustrating the connection between adjacent links of the conveyor chain;

FIG. 8 is a side elevational view of part of a conveyor in accordance with another embodiment of the invention;

FIG. 9 is a sectional view, on a larger scale, taken on line 9—9 of FIG. 8;

FIG. 10 is a top plan view of part of a conveyor in accordance with still another embodiment of the invention;

FIG. 11 is a sectional view, on a larger scale, taken on line 11—11 of FIG. 10;

FIG. 12 is a side elevational view of part of a conveyor in accordance with a further embodiment of the invention;

FIG. 13 is a sectional view taken on line 13—13 of FIG. 12;

FIG. 14 is a side elevational view of part of a conveyor in accordance with another embodiment of the invention;

FIG. 15 is a side elevational view of part of a conveyor in accordance with still another embodiment of the invention;

FIG. 16 is a sectional view taken on line 16—16 of FIG. 15;

FIG. 17 is a side elevational view of part of a conveyor in accordance with another embodiment of the invention;

FIG. 18 is a sectional view, on a larger scale, taken on line 18—18 of FIG. 17;

FIG. 19 is a side elevational view of part of a conveyor in accordance with still another embodiment of the invention; and FIG. 20 is a top plan view of the part of the conveyor shown in FIG. 19.

Referring now to the drawings in detail and particularly to FIGS. 1 to 7, the conveyor 10 comprises an endless rail 12 and an endless conveyor chain 14 which is suspended below the rail and is mounted for movement along the rail by the trolleys 16. The conveyor chain comprises a series of rigid links 18 which are disposed in end-to-end relation and adjacent ends of adjacent links are pivotally connected to each other to permit relative movement of the links with respect to each other in both horizontal and vertical planes. More particularly, one end of each link is provided with the bifurcated parts 20 and a pivot member 22 is positioned between the parts. A pivot pin 24 extends through parts 20 and member 22 and the upper end of the pin has a Y-shaped bracket 26 mounted for rotational movement thereon. The upper ends of the arms of the bracket carry the rollers 28 of the trolley which are in rolling engagement with the upper surface of the rail 12. The opposite end of each link is provided with the forked parts 30 and the pivot member 22 is positioned between said forked parts. A horizontal pivot pin 32 pivotally connects the forked parts to member 22 to complete the connection between adjacent links which permits universal movement of the links with respect to each other.

As indicated in FIG. 1, the conveyor chain has horizontal portions as well as inclined portions and it will be understood that the conveyor is able to transport articles suspended from the links of the chain to any location along the path of travel of the conveyor chain and these locations may be at different levels. The universal connection between adjacent links permits movement of the conveyor chain along a path which may have straight portions as well as curved portions and various portions of the path may be at different levels, as may be provided in a dry cleaning and laundry establishment, for example.

The rail 12 may be supported from floor stanchions or may be suspended from the ceiling by supports which are secured to the frame 34 of the conveyor. The drive for the conveyor chain comprises a sprocket wheel 36 whose teeth engage the upper part of the pivot pins 24, as said pins pass the position of the sprocket wheel, to drive the sprocket chain. The spokes of the sprocket wheel are provided with members 38 which engage the lower end of the pivot pins during their driving engagement with the teeth of the sprocket wheel and help maintain said pins in a vertical position since the pins have a tendency to tilt because of the pull of the downwardly inclined portions of the conveyor on the engaged pivot pins. The sprocket wheel is driven by a motor 40 which is connected by belt 42 to the pulley 44 of a speed reduction gear 46. The output shaft 48 of the reduction gear is keyed to the sprocket wheel and the sprocket wheel and its drive is supported on the frame 34 by the supporting plate 50.

As best seen in FIGS. 2 and 3, the pivot pins which are in driving engagement with the teeth of the sprocket wheel are prevented from jumping out of the recesses formed by the sides of the teeth and thereby becoming disengaged from said teeth, by the curved plate 52 whose inner surface is adjacent to the open ends of the sprocket teeth and only slightly spaced therefrom to cover the recesses. Plate 52 is supported from the frame 34 of the conveyor by the straps 54. In this manner, the tendency of the pivot pins to jump through the open ends of the teeth because of the forces exerted on the pins due to the inclined parts of the conveyor and other factors is prevented.

Each link of the chain is provided with a series of article supporting members 56 of hook-like configuration which as herein shown in FIGS. 1 and 4, are integral with the link. Members 56 are spaced from each other longitudinally of the link and the members of each link are in longitudinal alignment and are at different vertical levels, respectively. Although four article supporting members are shown herein for each link, it will be understood that any number of members may be provided on each link. As viewed in FIG. 4, the conveyor chain is traveling from right to left and the leading article supporting member A is at the highest level and each succeeding member is at a level which is lower than the preceding member, for reasons which will be more fully understood hereinafter. The articles 58, which may be garments or laundry of various kinds, are suspended from members 56 by hooks 60 although it will be understood that closed rings may also be used to support the articles from members 56.

Article supporting members A, B, C and D of each link are each adapted to carry a different classification of articles 85. For example, member A may carry trousers, member B may carry laundry, member C may carry dresses and member D coats. In accordance with the invention, these various classifications of articles are delivered by the conveyor to various preselected locations along the path of travel of the conveyor and are automatically discharged from the conveyor at the particular preselected location for that classification of articles. To accomplish this, a stationary pusher 62 is positioned along the path of travel of the conveyor chain at a location where a particular classification of articles is to be delivered. The number of pushers provided is the same as the number of article supporting members 56 on a link and it will be understood that the pushers are spaced from each other longitudinally along the path of travel of the conveyor chain and that a pusher is positioned at each location where a particular classification of articles is to be removed from the conveyor.

As shown in FIG. 4, pushers b, c and d are illustrated in dotted lines to indicate that the positions shown for these pushers are not their true positions but are illustrated in these positions for explanatory purposes. Each pusher is at a level which is the same as the level of the corresponding article supporting member 56 to which the pusher is operatively related for removing articles therefrom. Each pusher is supported from the frame 34 of the conveyor by a bracket 64 and a strap 66. The pusher comprises a vertical part 68 which is secured at its upper end to the bracket 64 and the lower end of the pusher includes a cross piece 70 and an article hook engaging part 72 which has a slanted cam edge 74. As best seen in FIG. 5, the side of part 72 of the pusher is adjacent to but slightly spaced from the side of member 56 and edge 74 is in position to engage hook 60 as said hook passes the position of the pusher which causes the hook to be lifted upwardly along the incline 76 of the hook portion of member 56 until hook 60 clears the upper end of the upturned part of member 56, at which time the hook 60 and the article 58 are free of the member and the hook slides down the inclined edge 74 of the pusher to fall into a bin or receptacle with the article 58. The angle of the incline 76 is steep enough to prevent the hooks 60 of the articles from falling off members 56 as said members travel down an inclined path.

In lieu of providing a bin for receiving the falling articles, a slick rail 78 may be provided at each pusher with the end of the slick rail in the same plane as edge 74 and slightly below the pointed end of said edge, as shown in FIGS. 5 and 6. The end 80 of the slick rail is preferably tapered to provide a small pointed end to catch the falling hook 60 and the slick rail is downwardly inclined for movement of the article by gravity along the length of the rail to another position. In this manner the articles are removed from the conveyor at the position of the pusher and are subsequently moved along the slick rail to another position which may be remote from the conveyor.

It will be apparent that in order to avoid interference between the articles carried on the members 56, it is necessary to remove the articles from the conveyor according to a definite sequence. More particularly, the articles on members A of each link of the chain are removed first and therefore the pusher $a$ is located at the position along the path of travel of the conveyor where articles are first to be delivered. Since pusher $a$ is at the highest level, the article hooks 60 carried by succeeding members B, C and D pass under pusher $a$ and are free to continue on to other locations where they are removed from the conveyor. Obviously, the next articles to be removed from the conveyor are those carried by members B of each of the links of the chain and pusher $b$ will accordingly be located along the path of travel of the conveyor at a position where it is desired to remove the second group of articles from the conveyor which are carried by members B. In a similar manner, pushers $c$ and $d$ are located at different positions along the path of travel of the conveyor and it will be apparent that pusher $c$ will be located at a position which is ahead of pusher $d$ and as the articles carried by members C pass pusher $c$, they are removed from the conveyor and in a similar manner the articles carried by members D are removed from the conveyor as they pass pusher $d$.

While the function of members A, B, C and D have been described above as being utilized for delivering different classifications of articles to different preselected locations along the path of travel of the conveyor, it will be understood that said members may also be used to deliver the same classification of articles but to deliver these articles to different locations along the path of travel of the conveyor. In such a case, the articles which are to be removed from the conveyor at the first preselected location are carried by the members A of each link of the chain and the articles which are to be removed from the conveyor at the second location along the path of travel of the conveyor are carried by members B of each link of the chain. Members C of each link of the chain carry articles which are to be delivered to the third position and members D of each link of the chain carry articles which are to be delivered to the fourth position along the path of travel of the conveyor and if additional positions of delivery are required, additional article supporting members 56 would be provided on each link of the chain so that the number of members 56 provided on each link of the chain would be the same as the number of delivery locations. It will be understood that this is similarly true in the case of different classifications of goods wherein the number of members 56 provided in each link of the chain corresponds to the number of different classifications of articles. Also, it will be understood that a combination of the foregoing can be effected. For example, as illustrated herein there are four article carrying members 56 provided on each link of the chain and these members may carry only two classifications so that the same classification of articles can be discharged at two different locations and the other classification of articles can also be discharged at two other and different locations.

Referring now to FIGS. 17 to 20, there are shown other embodiments of the invention wherein the article carrying members 56' and 56" are pivoted to each link 18' of the chain instead of being rigidly fixed thereto. The pivot connection of each member is indicated at 82 and the link is provided with slots 84 to permit the pivotal movement of the members in their respective links. Referring first to FIGS. 17 and 18, each member 56' is provided with a horizontally extending pin 86 at its upper end and the levels of the pins rise in a direction from left to right, as viewed in FIG. 17, which is opposite to the direction of movement of the conveyor chain. Each pin is of the same length and is adapted to engage a pusher 62' which is positioned along the path of travel of the conveyor at a level corresponding to the level of the pin of a corresponding member 56' of each link of the chain. It will be understood that the pushers 62' are spaced from each other along the path of travel of the conveyor chain and the pushers illustrated in dotted lines in FIG. 17 are not actually next to each other, as shown, but are spaced from each other along the path of travel of the conveyor.

As the conveyor chain moves from right to left, as viewed in FIG. 17, the pin 86 engages a corresponding pusher which is at the same level as the pin and causes the corresponding member 56' to rotate in a clockwise direction, as viewed in FIG. 17, which causes the hook of the article to fall off member 56'. As seen in FIG. 18, the pins 86 do not engage the vertical part 68' of the pusher and are only engaged by the slanting cam edge 74' of the pusher so that it is not necessary to place the highest level pusher at the first delivery position along the path of travel of the conveyor because the pins only engage the pusher which is at the same level as the pin.

In FIGS. 19 and 20, the article carrying members 56" have pins 86' which are at the same level but are of varying lengths, as shown. The pushers 62" have pin engaging parts 88 which are at different distances from the members 56" transversely of the path of movement of the conveyor chain. Accordingly, as a pin 86' passes a corresponding pusher, the member 56" is caused to rotate about its pivot to release the articles carried thereby. It will be observed that in this embodiment of the invention, the articles which are to be removed first are placed on the member of each link of the conveyor which has the longest pin 86', since the other members 56" of each link of the chain have shorter pins which freely pass the pusher which actuates the longest pin. As the previously actuated longer pin passes by a pusher for a shorter pin, said longer pin is again actuated but since it has previously been actuated and has released its articles, the subsequent actuation of the longer pin does not matter. As illustrated with respect to the previous embodiments of the invention, the dot-dash lines illustrating the pushers 62" are utilized to indicate that these pushers are not next to each other as shown, but are spaced from each other along the path of travel of the conveyor.

In the embodiments of the invention just described, the pushers are stationary and are always operative to remove articles from a corresponding article carrying member 56, 56', or 56" of each link of the chain as said member passes the position of the corresponding pusher. Referring now to FIGS. 8 and 9, there is shown another embodiment of the invention wherein the pushers 62 are movable vertically into operative and inoperative positions to remove articles from members 56, or not, as desired or as required. As herein shown, it will be understood that the pushers shown in dotted lines are spaced from each other along the path of travel of the conveyor and are shown herein for illustrative purposes only. Each pusher 62 is actuated by a solenoid 90 by securing the pusher to the plunger of the solenoid. The solenoids are supported on a bracket 92 which is secured to the frame of the conveyor. The upper position shown of the pusher is its normal and inoperative position and the article carrying members 56 pass under the pushers when in their inoperative positions. Upon energization of a solenoid, the pusher will be moved vertically downward into position at a level corresponding to the level of the member 56 for removing the articles therefrom. In accordance with this arrangement, articles may be discharged from the conveyor at the position of the pusher when its solenoid is energized and in the event that it is desired not to discharge articles at that particular location of the pusher, then the solenoid for said pusher is not energized.

In lieu of the arrangement shown in FIGS. 8 and 9, wherein a solenoid operated pusher is provided at each article discharge location, a series of solenoid operated pushers may be provided at each discharge location and the number of pushers provided is equal to the number of article carrying members 56 provided on each link of the chain. Accordingly, as the link of the chain passes a discharge location, any one of the solenoids may be operated to position the corresponding pusher at a level corresponding to the level of the member 56 from which it is desired to remove articles. As soon as the member 56 passes the actuated pusher said pusher is deenergized to move it up out of the way of succeeding members 56 which may be at a higher level than the actuated pusher. However, this would not be necessary in the case of the embodiment of the invention illustrated in FIGS. 17 and 18, since the pins 86 of the pivoted members 56' are unable to engage pushers 74' other than the pusher corresponding to the particular member.

In FIGS. 10 and 11 there is shown another embodiment of the invention wherein the pushers 62 are moved horizontally into operative position by the action of a solenoid 90'. Each solenoid and its connected pusher is mounted at a level corresponding to the level of the member 56 of each link to which it corresponds and the strokes of the plungers solenoids are the same. In the deenergized condition of the solenoid, the pusher is withdrawn into the solenoid so that the hooks 60 of the articles do not engage the pusher. Upon energization of any one of the solenoids, the pusher is moved horizontally into an operative position for engaging the hook 60 of the corresponding member 56 of each of the links as said link passes the position of the pusher.

In FIGS. 12 to 16, there are shown other embodiments of the invention wherein a single pusher is provided at each particular discharge location and the position of the pusher can be adjusted to remove articles from any one of the article supporting members 56. More particularly, and as illustrated in FIGS. 12 and 13, the pusher 62 is pivotally mounted at its upper end to the end of a link 94 whose opposite end is pivotally connected at 96 to a triangular shaped bracket 98 which may be secured to the frame of the conveyor. The pusher is adapted to move vertically up and down in a guide collar 100 which is secured to the bracket 98. Spaced from each other lengthwise along link 94 is a series of solenoids 102 which are secured to the bracket 98. The plungers of the solenoids are pivotally connected to the link, as at 104 and the strokes of the solenoids are the same. In the normal position of the pusher, with all the solenoids deenergized, the pusher is an upper position above any of the members 56 so that no articles are removed from the conveyor as they pass the position of the pusher. The pusher is lowered into any one of its operative positions by energizing the corresponding solenoid and it will be apparent that the length of movement of the pusher depends upon the solenoid actuated. The solenoid which is closest to the pivot 96 provides the maximum movement of pusher 62 and will position the pusher at the level corresponding to the level of the lowest member 56. Actuation of any one of the other solenoids positions the pusher at a level corresponding to the level of another one of the members 56 of the link. In this manner, articles from any one of the members 56 of a link may be removed as said link passes the position of the pusher. If it is desired to remove all the articles carried by the members 56 of a link, then each solenoid is actuated in turn to position the pusher at the levels, respectively, of the different members 56. As indicated above, it is necessary to move the pusher into its inoperative position if succeeding members 56 are at a lower level than the pusher since the pusher in such a position would remove articles from the lower members 56. This, of course, would not be necessary if the members 56 were pivoted and of the type shown in FIGS. 17 and 18. Obviously, the number of solenoids provided is equal to the number of article carrying members on each link of the chain.

In FIG. 14 there is shown another embodiment of the invention wherein the lever 94 is moved into various positions by a cam 106 which is provided, as shown herein, with five high spots to position the link into any one of four operative positions corresponding to the four members 56 provided for each link and into an inoperative position. The cam may be actuated manually, by a ratchet and pawl device or by a motor which upon energization will make one-fifth of a revolution.

In FIGS. 15 and 16, the pushers 62 are mounted 90° from each other on a rotary member 108 which carries a ratchet wheel 110. The rotary member is mounted on a stationary stub shaft 109. The pushers are of different lengths so that upon rotation of member 108 any one of the pushers may be moved into operative position to remove articles from the corresponding article carrying member 56. As shown herein, 90° rotation of member 108 is accomplished by energization of a relay 112 which causes the lever 114 to pivot resulting in horizontal movement of the pawl 116 causing rotation of member 108. Successive actuations of the relay will cause successive 90° rotation of the rotary member and thereby place any one of the pushers into operative position. A spring 118 maintains the contacts 120 of the relay normally open.

In the embodiment of the invention shown in FIGS. 15 and 16, it will be observed that a pusher is normally in an operative position and if it is desired or required that no articles be delivered at the position where the pushers are located, then member 108 may be rotated, for example 45°, so that no pushers are in operative position. In lieu of this, the pushers can be arranged around the rotary member spaced from each other at intervals of 72° so that the rotary member is provided with four operative positions and a fifth inoperative position at which no pusher is provided. At either side of this inoperative position and at 72° spaced therefrom, a pusher is provided. In this manner, a one-fifth turn of the rotary member brings a pusher into operative position or positions the rotary member into an inoperative position.

It should be understood that the various embodiments of the pushers and their arrangements, as described above and illustrated in FIGS. 8 through 15, may be utilized with the article carrying members illustrated in FIGS. 4 to 7 and 17 to 20. Also, the pushers may be actuated at the article discharge station where the pusher is located or at a position remote from said station.

While the slick rail 78 has been shown in FIGS. 5 and 6 positioned on the same side of the members 56 as the pushers 62, the preferred positions of the pushers and slick rails are on opposite sides of the member 56. Furthermore, where a slick rail is not used, two pushers can be provided at each discharge position, at opposite sides of the members 56. If desired or as required, wherever a slick rail is provided, the corresponding pusher may be eliminated since the slick rail in the position shown is operative to remove the article from its corresponding article carrying member and transfer said article to a position remote from the conveyor.

While we have shown and described the preferred embodiments of our invention, it will be understood that the invention may be embodied otherwise than as herein specifically illustrated or described, and that certain changes in the form and arrangement of parts and in the specific manner of practicing the invention may be made without departing from the underlying ideas or principles of this invention within the scope of the appended claims.

This application is related to our application Serial No. 252,919, filed January 21, 1963, which is a division of the present application.

Having thus described our invention, what we claim and desire to secure by Letters Patent is:

1. A conveyor comprising, an endless rail, article carrying means mounted for movement longitudinally along said rail and comprising an endless series of rigid links disposed in end-to-end relation and pivotally connected to each other at their respective adjacent ends for pivotal movement in vertical and horizontal planes, a plurality of said links each having each link being disposed in a vertical plane, a similar series of article carrying hooks integral with the companion link and spaced from each other longitudinally of said rail, at least a pair of said hooks of each link being at different levels, respectively, and a series of longitudinally spaced operating means positioned along the path of movement of said hooks for article removal operation with selective ones only of said hooks for selective removal of the articles carried thereby, one of said operating means being at a level corresponding to the level of one of said hooks of each of said pairs of hooks of each series of hooks and in position for operation with respect to said one hook only, and another of said operating means being at a different level corresponding to the level of the other of said hooks of each of said pairs of hooks of each series of hooks and in position for operation with respect to said other hook only.

2. A conveyor comprising, an endless rail, article carrying means mounted for movement longitudinally along said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of article carrying hooks integral with the companion link and spaced from each other longitudinally of said rail, at least a pair of said hooks of each link being at different levels, respectively, a series of longitudinally spaced operating means positioned along the path of movement of said hooks for article removal operation with selective ones only of said hooks for selective removal of the articles carried thereby, one of said operating means being at a level corresponding to the level of one of said hooks of each of said pairs of hooks of each series of hooks and in position for operation with respect to said one hook only, and another of said operating means being at a different level corresponding to the level of the other of said hooks of each of said pairs of hooks of each series of hooks and in position for operation with respect to said other hook only, and a series of longitudinally spaced downwardly inclined slick rails positioned below said hooks, one of said slick rails being in position to receive articles from said one hook only of each series of members, and another one of said slick rails being in position to receive articles from said other hook only of each series of hooks.

3. A conveyor comprising, an endless rail, article carrying means mounted for movement longitudinally along said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of article carrying hooks integral with the companion link and spaced from each other longitudinally of said rail, at least a pair of said hooks of each link being at different levels, respectively, a series of longitudinally spaced operating means positioned along the path of movement of said hooks and movable between inoperative and operative positions for article removal operation with selective ones only of said hooks for selective removal of the articles carried thereby, one of said operating means being at a level corresponding to the level of one of said hooks of each of said pairs of hooks of each series of hooks and movable into position for operation with respect to said one hook only, and another of said operating means being at a different level corresponding to the level of the other of said hooks of each of said pairs of hooks of each series of hooks and movable into position for operation with respect to said other hook only and means for moving said operating means.

4. A conveyor comprising, an endless rail, article carrying means mounted for movement longitudinally along said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of article carrying hooks integral with the companion link and spaced from each other longitudinally of said rail, at least a pair of said hooks of each link being at different levels, respectively, and a series of solenoid operated longitudinally spaced operating means positioned along the path of movement of said hooks and movable between inoperative and operative positions for article removal operation with selective ones only of said hooks for selective removal of the articles carried thereby, one of said operating means being at a level corresponding to the level of one of said hooks of each of said pairs of hooks of each series of hooks and movable into position for operation with respect to said one hook only, and another of said operating means being at a different level corresponding to the level of the other of said hooks of each of said pairs of hooks of each series of hooks and movable into position for operation with respect to said other hook only.

5. A conveyor comprising, an endless rail, article carrying means mounted for movement longitudinally along said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of article carrying hooks integral with the companion link and spaced from each other longitudinally of said rail, at least a pair of said hooks of each link being at different levels, respectively, and a series of solenoid operated longitudinally spaced operating means positioned along the path of movement of said hooks and movable between inoperative and operative positions for article removal operation with selective ones only of said hooks for selective removal of the articles carried thereby, one of said operating means being at a level corresponding to the level of one of said hooks of each of said pairs of hooks of each series of hooks and movable into position for operation with respect to said one hook only, and another of said operating means being at a different level corresponding to the level of the other of said hooks of each of said pairs of hooks of each series of hooks and movable into position for operation with respect to said other hook only, and a series of longitudinally spaced downwardly inclined slick rails positioned below said hooks, one of said slick rails being in position to receive articles from said one hook only of each series of hooks, and another one of said slick rails being in position to receive articles from said other hook only of each series of hooks.

6. A conveyor for carrying articles suspended from hooks, comprising an endless rail, article carrying means mounted for movement along said rail and comprising an endless series of rigid links disposed in end-to-end relation and each link being disposed in a vertical plane, means pivotally connecting adjacent ends of adjacent links to each other for pivotal movement in vertical and horizontal planes, a plurality of said links each having a similar series of article carrying members rigidly secured to the companion link and spaced from each other longitudinally of said rail, each article carrying member comprising an upturned hook from which said hook of the article is suspended, and a series of longitudinally spaced operating means positioned along the path of movement of said members for article removal operation with selective ones only of said members for selective removal of the articles carried thereby, one of said operating means being in position for operation with respect to one of said members only of each series of members, and another of said operating means being in position for operation with respect to another one only of said members of each series of members, each operating means having cam means for engaging said hook of the article and lifting it upwardly along said upturned hook and above the later to release said article therefrom.

7. A conveyor for carrying articles suspended from hooks, comprising an endless rail, article carrying means mounted for movement along said rail and comprising an endless series of rigid links disposed in end-to-end relation and each link being disposed in a vertical plane, means pivotally connecting adjacent ends of adjacent links to each other for pivotal movement in vertical and horizontal planes, a plurality of said links each having a similar series of article carrying members integral with to the companion link and spaced from each other longitudinally of said rail, each article carrying member comprising an upturned hook from which said hook of the article is suspended, and a series of longitudinally spaced operating means positioned along the path of movement of said members for article removal operation with selective ones only of said members for selective removal of the articles carried thereby, one of said operating means being in position for operation with respect to one of said members only of each series of members, and another of said operating means being in position for operation with respect to another one only of said members of each series of members, each operating means having a cam surface for engaging said hook of the article and lifting it upwardly along said upturned hook and above the latter to release said article therefrom, and a series of longitudinally spaced downwardly inclined slick rails positioned below said members, one of said slick rails being in position to receive articles from said one member only of each series of members, and another one of said slick rails being in position to receive articles from said other member only of each series of members.

8. Conveyor apparatus comprising, an endless rail, an endless article carrying chain mounted for circulatory movement on said rail and comprising an endless series of rigid links disposed in end-to-end relation and pivotally connected to each other at their respective adjacent ends for pivotal movement in vertical and horizontal planes, each link being disposed in a vertical plane, a plurality of said links each having a similar series of article carrying hooks spaced from each other fixed distances apart, said hooks of each one of said plurality of links corresponding to the hooks of each one of the other links of said plurality of links, and a series of spaced article removing operating means, corresponding to each one of said series of article carrying hooks of said plurality of links, and positioned to be passed by said article carrying hooks as said chain moves around said rail, each of said article removing operating means being positioned relative to a corresponding one of said article carrying hooks of each one of said series of article carrying hooks for control by passage of said corresponding one article carrying hook to cause removal of the article carried by said corresponding one article carrying hook.

9. Conveyor apparatus as defined in claim 8, wherein said article removing operating means are longitudinally spaced from each other and said article carrying hooks of each series are longitudinally spaced from each other, and slick rail means associated with at least one of said article removing operating means, said slick rail means including means positioned with respect to said one corresponding article removing operating means for receiving and transporting articles, which are caused to be removed by the latter, to positions remote from said corresponding article removing operating means.

10. Conveyor apparatus as defined in claim 8, wherein said article carrying hooks are integral with the companion link.

11. Conveyor apparatus as defined in claim 8, wherein at least one of said article removing operating means comprises a lever pivoted at one of its ends and an article removing operating member operatively connected to its opposite end, and a series of lever actuating means spaced from each other along the length of said lever for moving said lever at different distances from its pivot so that the opposite end of said lever and said article removing operating member are moved to correspondingly different levels.

12. Conveyor apparatus as defined in claim 8, wherein at least one of said article removing operating means comprises a lever pivoted at one of its ends and an article removing operating member operatively connected to the lever at its opposite end, and cam means positioned along the length of said lever and operable to move said opposite end of said lever and said article removing operating member to different levels.

13. Conveyor apparatus as defined in claim 8, wherein at least one of said article removing operating means comprises a rotary member having a plurality of article removing operating members circumferentially spaced from each other and each extending a different distance from the axis of said rotary members, and means for rotating said rotary member to position any one of said article removing operating members in operative position.

14. Conveyor apparatus as defined in claim 9, wherein said article carry hooks of each series are in longitudinal alignment with each other.

15. Conveyor apparatus as defined in claim 9, wherein a plurality of said article removing operating means are movable between operative article removing positions and inoperative non-article removing positions, and means for moving said movable article removing operating means into said operative and inoperative positions.

16. Conveyor apparatus as defined in claim 15, wherein said moving means comprises solenoid operated moving means.

17. Conveyor apparatus as defined in claim 10, wherein said article carrying hooks of each series of article carrying hooks are at different levels, respectively, and said series of article removing operating means are at correspondingly different levels, respectively.

18. Conveyor apparatus as defined in claim 17, wherein said article carrying hooks of each series of article carrying hooks are in longitudinal alignment with each other and are longitudinally spaced from each other, and said article removing operating means are longitudinally spaced from each other.

19. Conveyor apparatus as defined in claim 18, wherein the articles are suspended from hooks carried by said article carrying hooks and each of said article removing operating means comprises a rigid elongated member having means at one end thereof in position to engage the hook from which the article is suspended as the companion article carrying hook passes by to lift said article hook and the article suspended therefrom from said companion article carrying hook, the remaining part of said elongated member comprising a downwardly inclined slick rail for moving said article hook and article from said one end of said elongated member to a position remote from said conveyor chain.

20. A conveyor comprising, an endless rail having parts which are at levels that are higher than other parts of the rail, an endless article carrying chain comprising an endless series of rigid links disposed in end-to-end relation and pivotally connected to each other at their respective adjacent ends for pivotal movement in vertical and horizontal planes, means suspending said chain from said rail for movement of said chain below said rail, each of said links being disposed in a vertical plane and each comprising a similar series of longitudinally spaced and longitudinally aligned article carrying hooks integral with the companion link, said hooks of the series being positioned at different levels, respectively, and a series of longitudinally spaced article removing means, corresponding to each one of said series of article carrying hooks of said plurality of links, and positioned adjacent to and laterally of said chain for passing by said article carrying hooks to cause removal of the articles carried by the companion hook, each article removing means being positioned at a level corresponding to the level of a companion one of said hooks of the series for removing articles therefrom.

21. A conveyor as defined in claim 20, said article removing means including means for lifting the article from the companion hook as the latter passes the position of said article removing means to remove the article from said hook.

References Cited in the file of this patent

UNITED STATES PATENTS

| | | |
|---|---|---|
| 386,314 | Green | July 17, 1888 |
| 1,556,723 | Shaffer | Oct. 13, 1925 |
| 2,609,083 | Leach | Sept. 2, 1952 |
| 2,661,828 | Vogt et al. | Dec. 8, 1953 |
| 2,834,475 | Reich | May 13, 1958 |
| 2,899,072 | Weiss | Aug. 11, 1959 |
| 2,946,427 | Freedman | July 26, 1960 |
| 2,953,240 | Nigrelli et al. | Sept. 20, 1960 |
| 3,006,453 | Tonelli | Oct. 31, 1961 |

FOREIGN PATENTS

| | | |
|---|---|---|
| 1,131,860 | France | Feb. 28, 1957 |

OTHER REFERENCES

Michna: Pamphlet, June 5, 1963 (pages 3 and 11 relied on).